United States Patent

Holmi

(10) Patent No.: US 7,881,488 B2
(45) Date of Patent: Feb. 1, 2011

(54) IN-PLANE SPEAKER

(75) Inventor: Douglas J. Holmi, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 1111 days.

(21) Appl. No.: 11/591,285

(22) Filed: Nov. 1, 2006

(65) Prior Publication Data

US 2008/0101646 A1     May 1, 2008

(51) Int. Cl.
    *H04R 25/00* (2006.01)
(52) U.S. Cl. .................... 381/386; 381/395
(58) Field of Classification Search ........ 381/182, 381/386, 86–89, 332–335, 389, 395, 345, 381/351
    See application file for complete search history.

(56) References Cited

U.S. PATENT DOCUMENTS

| | | | |
|---|---|---|---|
| 4,177,873 A | | 12/1979 | Ripple |
| 4,453,047 A | * | 6/1984 | Thompson ............ 381/395 |
| 4,783,820 A | * | 11/1988 | Lyngdorf et al. ........ 381/89 |
| 4,805,221 A | * | 2/1989 | Quaas .............. 381/335 |
| 5,228,090 A | | 7/1993 | Marler |
| 5,446,793 A | | 8/1995 | Piccaluga et al. |
| 6,389,146 B1 | * | 5/2002 | Croft, III ............ 381/345 |
| 6,678,384 B2 | * | 1/2004 | Kowaki et al. .......... 381/182 |
| 7,062,054 B2 | * | 6/2006 | Nishikawa et al. ....... 381/182 |
| 2004/0100123 A1 | | 5/2004 | Shea |

FOREIGN PATENT DOCUMENTS

| EP | 1 370 110 A | 12/2003 |
|---|---|---|
| EP | 1 679 936 A | 7/2006 |

OTHER PUBLICATIONS

Andrew D. Unruh, et al., Linear Array Transducer Technology, Oct. 5-8, 2006, Presented at the 121$^{st}$ Convention of the Audio Engineering Society Convention paper 6937, San Francisco, CA, USA.
Tymphany, The Tymphany Linear Array Transducer An Alternative Form-Factor Loudspeaker A Technology White Paper. Copyright 2005-2006.
International Preliminary Report on Patentability dated Feb. 19, 2009 for PCT/US07/083353.
European Office Action dated Oct. 13, 2009 for EP 07 844 811.5-2225.
International Search Report and Written Opinion dated Feb. 26, 2008 for PCT/US07/083353.
European Examination Report dated Nov. 19, 2010, for Application No. 07844811.5, 6 pages.

* cited by examiner

*Primary Examiner*—Suhan Ni

(57) ABSTRACT

An electro-acoustic transducer is oriented such that its transducer axis is parallel to, and in, the plane of a baffle coupled to the electro-acoustic transducer for reduced baffle vibration.

16 Claims, 5 Drawing Sheets

IN-PLANE SPEAKER

BACKGROUND OF THE INVENTION

The present invention relates to audio systems in vehicles. More specifically, the invention relates to electro-acoustic driver enclosures and orientations under severe spatial constraints.

SUMMARY OF THE INVENTION

An electro-acoustic transducer is oriented such that its transducer axis is parallel to, and in, the plane of a baffle coupled to the electro-acoustic transducer for reduced baffle vibration.

One embodiment of the present invention is directed to an apparatus comprising: a baffle; an electro-acoustic transducer characterized by a transducer axis; and a housing supporting the electro-acoustic transducer at an orientation such that the transducer axis is parallel to a plane characterizing the baffle. In one aspect, the baffle is selected from a group consisting of a vehicle door panel, a vehicle rear package shelf, a vehicle instrument panel, a room ceiling, or a room wall. In one aspect, the baffle is an inner door panel of a vehicle. In one aspect, the transducer axis is in the plane characterizing the baffle. In one aspect, the housing is an enclosure. In one aspect, the enclosure is sealed. In one aspect, the enclosure is mounted to an interior door panel. In one aspect, the enclosure is mounted to a vehicle door frame. In one aspect, the enclosure includes an acoustic element acoustically coupling an enclosure volume to a listening area. In one aspect, the acoustic element is a port. In one aspect, the electro-acoustic transducer is oriented such that the transducer axis is displaced a distance from the plane characterizing the baffle. In one aspect, the distance is selected to reduce vibration imparted to the baffle. In one aspect, the distance is less than a radius characterizing a size of the electro-acoustic transducer.

BRIEF DESCRIPTION OF THE DRAWINGS

The invention will be described by reference to the preferred and alternative embodiments thereof in conjunction with the drawings in which.

DETAILED DESCRIPTION

Figure 1:
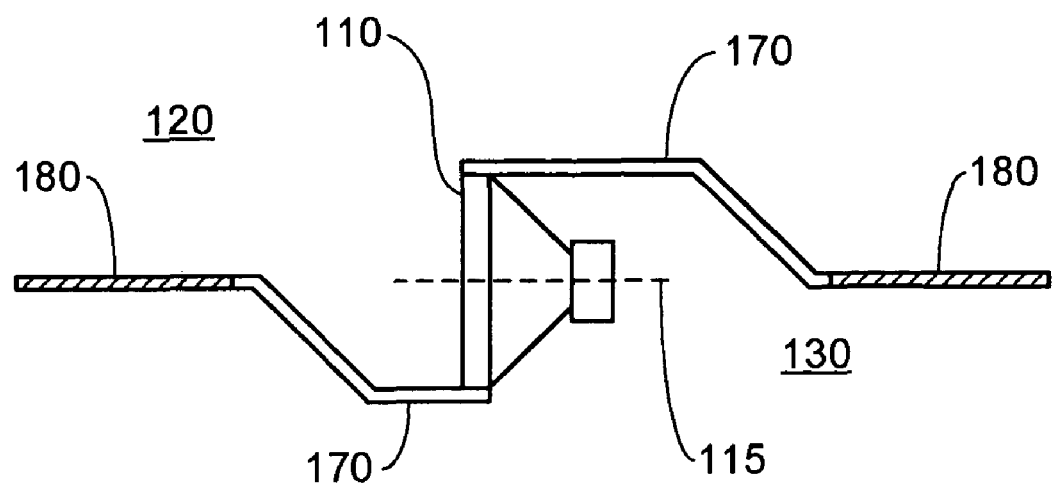
FIG. 1 is a diagram illustrating an embodiment of the present invention.

FIG. 1 is a diagram illustrating an embodiment of the present invention. In FIG. 1, electro-acoustic transducer 110 is oriented perpendicular to a listening area 120. Electro-acoustic transducer 110 generates low frequency acoustic signals, preferably less than 300 Hz, in response to an electrical signal, not shown, applied to the electro-acoustic transducer 110. Electro-acoustic transducer 110 is characterized by a transducer axis 115 that indicates the displacement of a diaphragm of the electro-acoustic transducer 110 during the generation of the low frequency acoustic signals.

The electro-acoustic transducer 110 is mounted in a housing 170. A cover grill, not shown, may be positioned to hide the electro-acoustic transducer 110 from the listening area 120. The housing 170 is coupled to a baffle 180. In FIG. 1, the housing 170 and baffle 180 separate the listening area 120 from a cavity 130. The baffle 180 may be an interior surface of a vehicle or a room such as, for example, a vehicle instrument panel, a vehicle rear package shelf, a vehicle door trim panel, a room wall, or a room ceiling. The baffle is typically stiff in the plane of the baffle but is susceptible to vibrations perpendicular to the baffle plane.

When an electro-acoustic transducer is mounted to the baffle oriented with the transducer axis perpendicular to the baffle plane, a reaction force generated by the movement of the diaphragm is applied as a perpendicular force on the baffle causing the baffle to vibrate. The out-of-plane vibration of the baffle may generate a buzzing or other audible noise that detracts from the acoustic signal. In spite of the baffle vibration caused by orienting the transducer axis perpendicular to the baffle, electro-acoustic transducers are still mounted in this fashion. Acoustic signals become more directional as the frequency increases and the capability to transmit the high frequency acoustic signals into the listening area has a higher priority in the design of vehicular audio systems, especially in light of other baffle vibration reduction methods. An example of such a baffle vibration reduction method is disclosed in U.S. Pat. No. 6,985,593 issued on Jan. 10, 2006. As the frequency decreases, however, the lower frequency acoustic signals become more omni-directional thereby allowing greater freedom in orientation of the electro-acoustic transducer with respect to the listening area.

In FIG. 1, the transducer axis 115 is in the plane of the baffle. Without being limiting, it is believed that the reaction force generated by the movement of the diaphragm is applied as an in-plane force on the baffle thereby reducing perpendicular (out-of-plane) vibrations in the baffle. Furthermore, any torques generated by the reaction force may be transmitted to the baffle 180 via the housing and structural ribs and/or the covering grill that mechanically couple a portion of the electro-acoustic transducer 110 to the housing 170.

Figure 2:
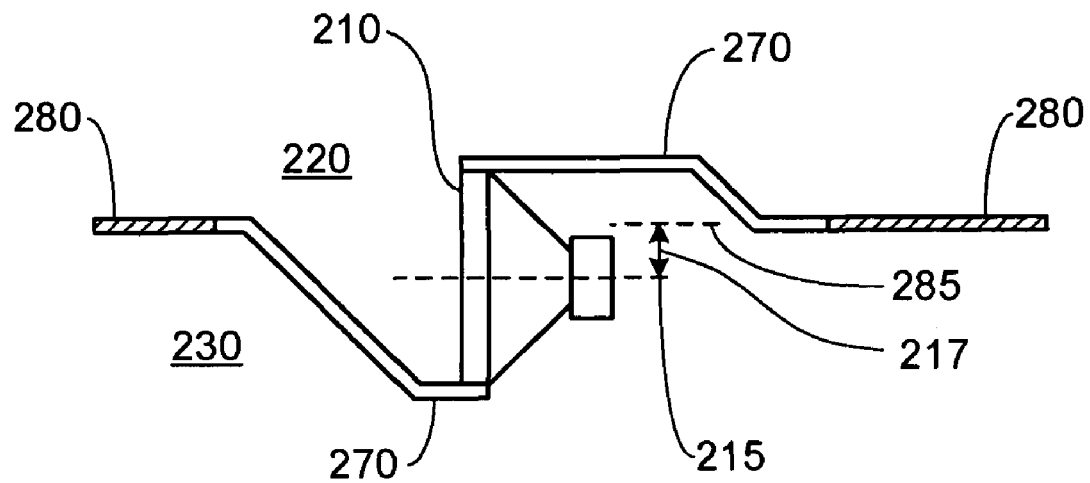
FIG. 2 is a diagram illustrating another embodiment of the present invention.

FIG. 2 is a diagram illustrating another embodiment of the present invention. In FIG. 2, electro-acoustic transducer 210 is characterized by a transducer axis 215 that indicates the movement of a diaphragm of the electro-acoustic transducer 210 during the generation of an acoustic signal. Electro-acoustic transducer 210 is mounted to a housing 270. Housing 270 may be attached to baffle 280, which may be an interior surface such as, for example, a vehicle instrument panel, a vehicle rear package shelf, a vehicle door panel, a room wall, or a room ceiling. In other embodiments, housing 270 may be mounted to a support structure such as, for example, a vehicle door frame, a vehicle door outer panel, a vehicle door trim panel, or a vehicle door inner panel such that housing 270.

Housing 270 and baffle 280 separate a listening area 220 from a cavity 230. The cavity 230 may be a volume separate from the listening area such as, for example, a vehicle trunk, an internal volume of a vehicle door, an interior volume of an instrument panel, an interior volume of a ceiling, or an interior volume of a wall.

In FIG. 2, transducer axis 215 is parallel to, but displaced from a plane 285 defining the baffle 280. The displacement of the transducer axis 215 from the baffle plane 285 is indicated in FIG. 2 by line 217. Although FIG. 2 shows the transducer axis 215 displaced downward from the baffle plane 285, a displacement above the baffle plane 285 is understood to be within the scope of the present invention and may be desired when the available cavity space cannot accommodate the electro-acoustic transducer 210.

The displaced axis shown in FIG. 2 may create an unbalanced torque from the reaction force of the diaphragm applied to unequal lever arms that can create an out-of-plane vibration in the baffle 280. The baffle vibration, however, is expected to be reduced relative to the vibration generated when the transducer axis is oriented perpendicular to the baffle plane. Baffle vibration is expected to be further reduced when the transducer axis displacement is less than a radius characterizing a size of the electro-acoustic transducer 210.

Figure 3:
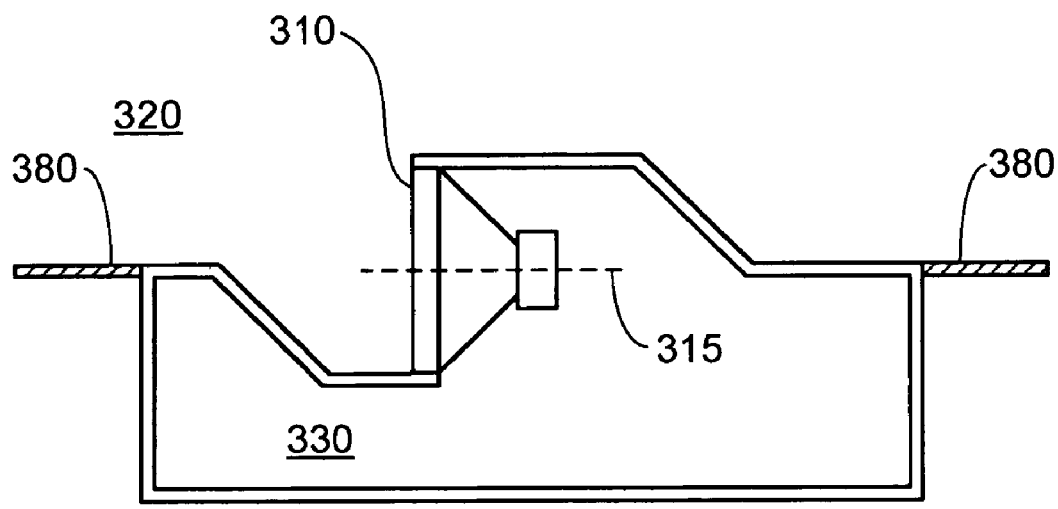
FIG. 3 is a diagram illustrating another embodiment of the present invention.

FIG. 3 is a diagram illustrating another embodiment of the present invention. In FIG. 3, electro-acoustic transducer 310 is oriented such that a transducer axis 315 is in a plane characterizing a baffle 380. The baffle 380 may be an interior surface of a vehicle or a room such as, for example, a vehicle instrument panel, a vehicle rear package shelf, a vehicle door panel, a room ceiling, or a room wall. Electro-acoustic transducer 310 is mounted in an enclosure 330. Enclosure 330 may be mounted to the baffle 380 or may be mounted to a support structure behind the baffle 380 such as, for example, a vehicle door frame, a vehicle outer panel, a vehicle inner panel, a vehicle door trim panel, a ceiling stud, or a wall stud.

Figure 4:
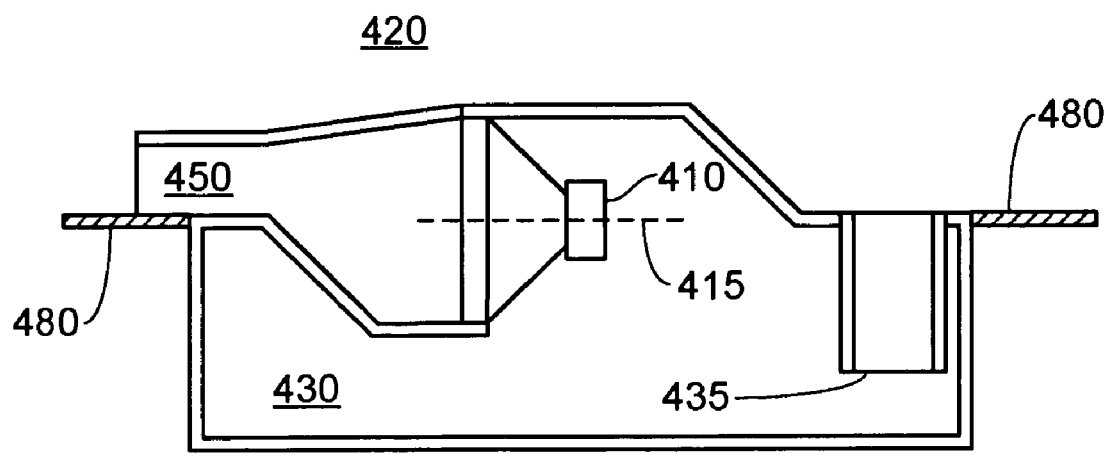
FIG. 4 is a diagram illustrating another embodiment of the present invention.

FIG. 4 is a diagram illustrating another embodiment of the present invention. In FIG. 4, electro-acoustic transducer 410 is oriented such that a transducer axis 415 is in a plane characterizing a baffle 480. The baffle 480 may be an interior surface of a vehicle or a room such as, for example, a vehicle instrument panel, a vehicle rear package shelf, a vehicle door panel, a room ceiling, or a room wall. Electro-acoustic transducer 410 is mounted in an enclosure 430. Enclosure 430 may be mounted to the baffle 480 or may be mounted to a support structure behind the baffle 480. Enclosure 480 may include one or more acoustic elements to filter an acoustic signal transmitted to the listening area 420. The acoustic element may be, for example, a port, a passive radiator, a waveguide, or other structures known to the skilled artisan. For example, in FIG. 4, a port 435 couples an acoustic signal generated in the enclosure 430 by the electro-acoustic transducer 410 to the listening area 420. A second port 450 may be used to filter an acoustic signal generated by the electro-acoustic transducer 410.

Figure 5:
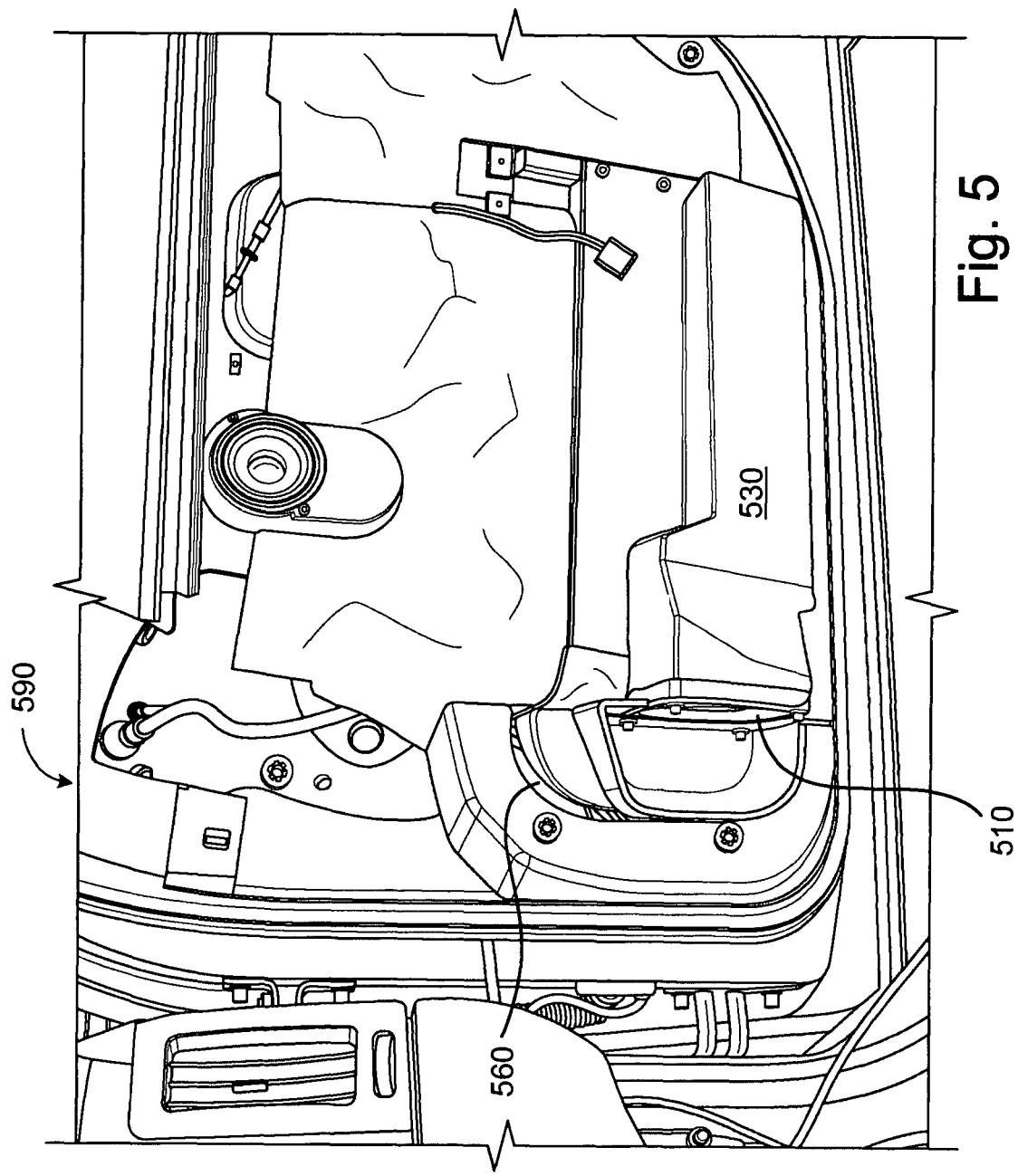
FIG. 5 shows a vehicle door with the interior door panel removed illustrating another embodiment of the present invention.

FIG. 5 shows a vehicle door with the interior trim panel removed illustrating another embodiment of the present invention. In FIG. 5, an enclosure 530 supporting an electro-acoustic transducer 510 is sized to fit into an opening 560 in an inner door panel 590 of a vehicle. The electro-acoustic transducer 510 is oriented such that a transducer axis is parallel to, and substantially in a plane of the interior trim panel.

Figure 6:
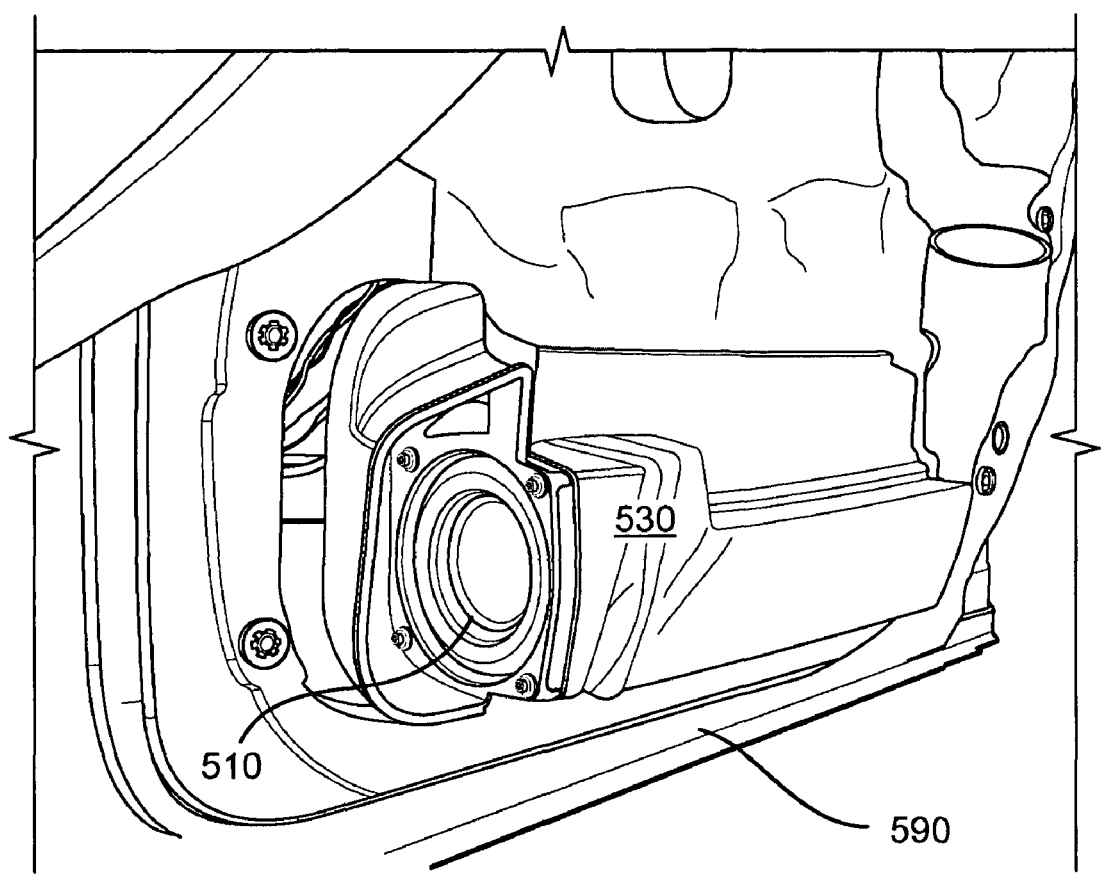
FIG. 6 shows another view of the embodiment shown in FIG. 5.

FIG. 6 shows another view of the embodiment shown in FIG. 5. In FIG. 6, enclosure 530 extends into the passenger compartment of the vehicle in order to accommodate the in-plane orientation of the electro-acoustic transducer 510. The extension into the passenger compartment, however, is at or below the passenger seat and likely is not perceived by the passenger as a reduction in the interior space of the vehicle.

Figure 7:
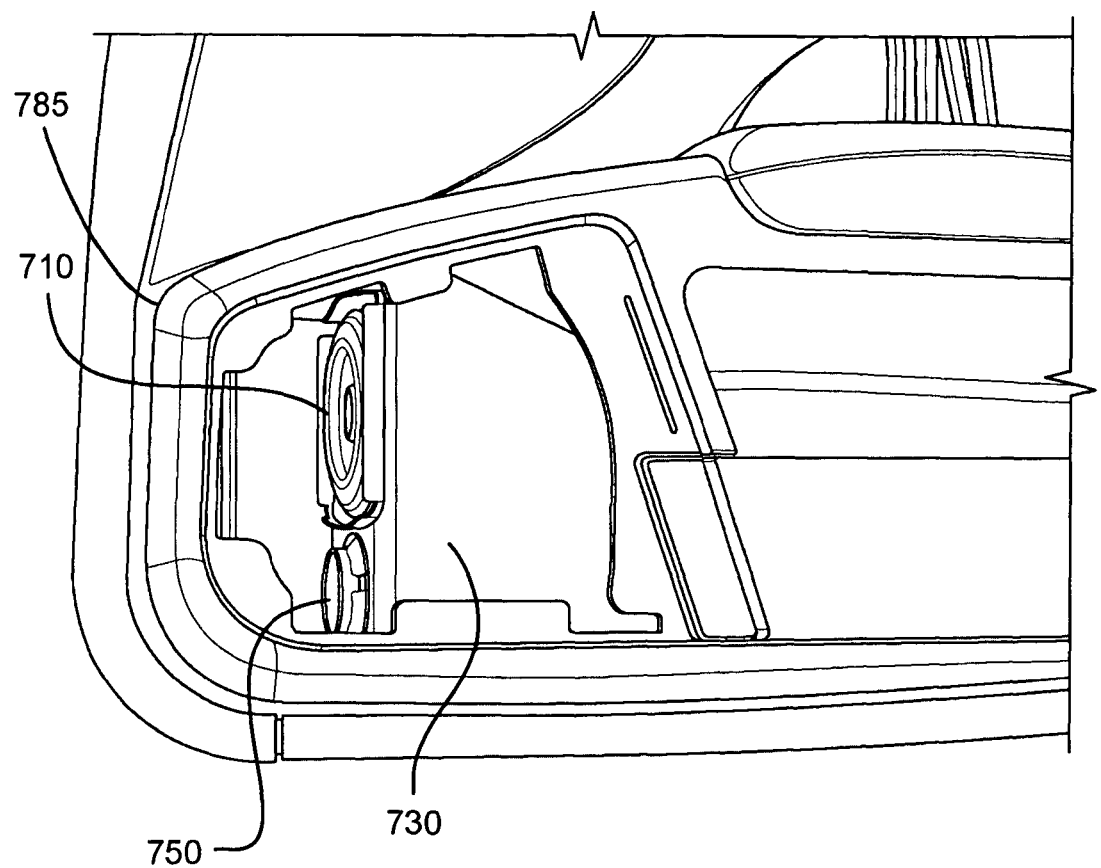
FIG. 7 shows a vehicle door with an electro-acoustic transducer grill removed illustrating another embodiment of the present invention.

FIG. 7 shows a vehicle door with an electro-acoustic transducer grill removed illustrating another embodiment of the present invention. In FIG. 7, an enclosure 730 is partially covered by an interior trim panel 785. Enclosure 730 supports an electro-acoustic transducer 710 with its transducer axis oriented parallel but displaced from the panel plane. A port 750 acoustically couples an interior volume of the enclosure 730 to the listening area. In other embodiments, the port 750 may be replaced by a passive radiator. The passive radiator may be mounted in an orientation such that a radiator axis characterizing the axis of movement of the passive radiator is parallel to the transducer axis. The radiator axis may be in the panel plane or offset from the panel plane.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. An apparatus comprising:
a baffle;
an electro-acoustic transducer seated in the baffle and characterized by a transducer axis, a first radiating surface, and a second radiating surface; and
a housing supporting the electro-acoustic transducer at an orientation such that the transducer axis is parallel to a plane characterizing the baffle, the housing and baffle separating a listening area from a cavity,
the cavity isolating the second radiating surface from the listening area.

2. The apparatus of claim 1 wherein the baffle is selected from a group consisting of a room wall, a room ceiling, a vehicle door panel, a vehicle rear package shelf, or a vehicle instrument panel.

3. The apparatus of claim 1 wherein the baffle is an interior door panel of a vehicle.

4. The apparatus of claim 1 wherein the transducer axis is in the plane characterizing the baffle.

5. The apparatus of claim 1 wherein the housing is an enclosure.

6. The apparatus of claim 5 wherein the enclosure is sealed.

7. The apparatus of claim 5 wherein the enclosure is mounted to an inner door panel.

8. The apparatus of claim 5 wherein the enclosure is mounted to a vehicle door frame.

9. The apparatus of claim 5 wherein the enclosure is mounted to a vehicle door trim panel.

10. The apparatus of claim 5 wherein the enclosure is mounted to a wall stud.

11. The apparatus of claim 1 wherein the enclosure includes an acoustic element acoustically coupling an enclosure volume to a listening area.

12. The apparatus of claim 11 wherein the acoustic element is a port.

13. The apparatus of claim 11 wherein the acoustic element is a passive radiator.

14. The apparatus of claim 13 wherein a radiator axis characterizing a movement of the passive radiator is parallel to the transducer axis.

15. The apparatus of claim 1 wherein the electro-acoustic transducer is oriented such that the transducer axis is displaced from the plane characterizing the baffle by a distance that is less than a radius characterizing a size of the electro-acoustic transducer.

16. The apparatus of claim 15 wherein the distance is selected to reduce vibration imparted to the baffle.

* * * * *